(12) United States Patent
Zhang et al.

(10) Patent No.: US 11,120,153 B2
(45) Date of Patent: Sep. 14, 2021

(54) RESOURCE FILE PROCESSING SYSTEM AND METHOD BASED ON BLOCKCHAIN STRUCTURE

(71) Applicant: CHINA UNIONPAY CO., LTD., Shanghai (CN)

(72) Inventors: Limin Zhang, Shanghai (CN); Jinzhi Hua, Shanghai (CN); Sishuang Wan, Shanghai (CN); Weiqi Yu, Shanghai (CN); Xu Le, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 262 days.

(21) Appl. No.: 16/334,278

(22) PCT Filed: Sep. 8, 2017

(86) PCT No.: PCT/CN2017/101032
§ 371 (c)(1),
(2) Date: Mar. 18, 2019

(87) PCT Pub. No.: WO2018/050024
PCT Pub. Date: Mar. 22, 2018

(65) Prior Publication Data
US 2019/0220615 A1      Jul. 18, 2019

(30) Foreign Application Priority Data
Sep. 19, 2016   (CN) .......................... 201610829289.7

(51) Int. Cl.
*H04L 29/06* (2006.01)
*G06F 21/62* (2013.01)
(Continued)

(52) U.S. Cl.
CPC ........ *G06F 21/6218* (2013.01); *G06F 16/148* (2019.01); *H04L 9/0637* (2013.01);
(Continued)

(58) Field of Classification Search
CPC .. G06F 21/6218; G06F 16/148; G06F 21/606; H04L 9/0637; H04L 9/0435;
(Continued)

(56) References Cited

U.S. PATENT DOCUMENTS

2016/0191243 A1   6/2016   Manning
2017/0046664 A1*  2/2017   Haldenby ............... G06F 21/62
(Continued)

FOREIGN PATENT DOCUMENTS

| CN | 105591753 | 5/2016 |
| CN | 105719185 | 6/2016 |

(Continued)

OTHER PUBLICATIONS

International Search Report with English Translation of the International Searching Authority corresponding to International Patent Application No. PCT/CN2017/101032 dated Nov. 30, 2017. (5 pages).

(Continued)

*Primary Examiner* — Shin-Hon (Eric) Chen
(74) *Attorney, Agent, or Firm* — Myers Bigel, P.A.

(57) ABSTRACT

The present invention provides a resource file processing method based on a blockchain structure. The method includes a member node in a blockchain including at least one supervision node and at least one member node constructs a resource file registration request according to a user instruction, and sends the resource file registration request to one of the at least one supervision node. According to the resource file registration request from any member node, the at least one supervision node audits and registers a resource file indicated by the resource file registration request, and transmits the registration result back to the member node initiating the resource file registration request. The at least one member node performs an operation on a real physical (Continued)

resource associated with the registered resource file by performing data communication with another member node.

14 Claims, 1 Drawing Sheet

(51) Int. Cl.
*H04L 29/08* (2006.01)
*H04L 9/32* (2006.01)
*G06F 16/14* (2019.01)
*H04L 9/06* (2006.01)
*G06Q 50/16* (2012.01)
*G06F 21/60* (2013.01)
*G06Q 30/06* (2012.01)

(52) U.S. Cl.
CPC ........ *H04L 9/3239* (2013.01); *H04L 63/0435* (2013.01); *H04L 67/1002* (2013.01); *H04L 67/32* (2013.01); *G06F 21/606* (2013.01); *G06Q 30/0645* (2013.01); *G06Q 50/16* (2013.01); *H04L 2209/38* (2013.01)

(58) Field of Classification Search
CPC ............... H04L 9/3239; H04L 63/0435; H04L 67/1002; H04L 67/32; H04L 2209/38; G06Q 30/0645; G06Q 50/16
See application file for complete search history.

(56) References Cited

U.S. PATENT DOCUMENTS

| | | | |
|---|---|---|---|
| 2017/0054611 A1* | 2/2017 | Tiell | H04L 43/0876 |
| 2017/0237570 A1* | 8/2017 | Vandervort | G16H 10/60 713/176 |
| 2017/0295180 A1* | 10/2017 | Day | H04L 9/0836 |
| 2017/0301047 A1* | 10/2017 | Brown | G06Q 20/382 |
| 2017/0331810 A1* | 11/2017 | Kurian | H04L 9/3213 |
| 2017/0344988 A1* | 11/2017 | Cusden | G06F 21/00 |
| 2017/0352116 A1* | 12/2017 | Pierce | H04L 63/10 |
| 2018/0068130 A1* | 3/2018 | Chan | G06F 21/64 |
| 2018/0225611 A1* | 8/2018 | Daniel | G06F 16/27 |

FOREIGN PATENT DOCUMENTS

| | | |
|---|---|---|
| CN | 105808325 | 7/2016 |
| CN | 106331151 | 1/2017 |

OTHER PUBLICATIONS

Chinese Office Action corresponding to Chinese Patent Application No. 201610829289.7 dated Feb. 3, 2019. (5 pages).

\* cited by examiner

RESOURCE FILE PROCESSING SYSTEM AND METHOD BASED ON BLOCKCHAIN STRUCTURE

CROSS REFERENCE TO RELATED APPLICATIONS

This application is a 35 U.S.C. § 371 national stage application of PCT International Application No. PCT/CN2017/101032, filed on Sep. 8, 2017, which claims priority from Chinese Patent Application No. 201610829289.7, filed on Sep. 19, 2016, the contents of which are incorporated herein by reference in their entireties. The above-referenced PCT International Application was published in the Chinese language as International Publication No. WO 2018/050024 A1 on Mar. 22, 2018.

TECHNICAL FIELD

The present invention relates to a resource file processing system and method, and more particularly to a resource file processing system and method based on a blockchain structure.

BACKGROUND TECHNOLOGY

With the increasing popularity of web-based applications and the growing variety of services in different fields (e.g., the financial sector), nowadays it has become increasingly important to process specific resource files (i.e., files associated with ownership of real physical resources, such as real estate ownership files) in an highly effective manner.

In the prior art technical solution, specific resource files are typically processed by a central data processing serve centralizing paper or electronic target resource files, and then manually or automatically processing these target resource files.

The prior art technical solution, however, has the problems of low efficiency and unbalanced load distribution due to the centralized processing mode, and low security as there is lack of effective supervision over files associated with ownership indicated by the target resource files.

Therefore, it is necessary to provide a resource file processing system and method based on a blockchain structure, with high resource file processing efficiency, low cost and high security.

SUMMARY OF THE INVENTION

In order to solve the problems of the above prior art technical solution, the present invention proposes a resource file processing system and method based on a blockchain structure, with high resource file processing efficiency, low cost and high security.

The object of the present invention is achieved by the following technical solution:
A resource file processing system based on a blockchain structure, comprising at least one supervision node and at least one member node, and the at least one supervision node and each of the at least one member node being separate blocks that are mutually connected to form a blockchain; wherein the at least one supervision node, according to a resource file registration request from any member node, is configured to audit and register a resource file indicated by the resource file registration request, and transmit the registration result back to the member node initiating the resource file registration request; wherein each of the at least one member node is configured to construct the resource file registration request according to a user instruction, and sends the resource file registration request to one of the at least one supervision node, and the at least one member node is further configured to perform an operation on a real physical resource associated with the registered resource file by performing data communication with another member node.

In the solution disclosed above, preferably, only the supervision node can audit and register the resource file.

In the solution disclosed above, preferably, the resource file is an electronic file and is transmitted in an encrypted manner between related nodes of the blockchain.

In the solution disclosed above, preferably, each of the at least one member node can be associated with an intermediary entity and/or individual, i.e., the intermediary entity and/or individual can access the blockchain via one or more of the at least one member node.

In the solution disclosed above, preferably, after the intermediary entity accesses the blockchain via one or more of the at least one member node, the intermediary entity is capable of performing a management operation on a real physical resource associated with the registered resource file via the member node 2.

In the solution disclosed above, preferably, after the individual accesses the blockchain via one or more of the at least one member node, the individual is capable of performing a management operation on a real physical resource associated with the registered resource file via the member node and/or by performing data communication with a member node accessed by the intermediary entity.

In the solution disclosed above, preferably, the intermediary entity is capable of querying and browsing a resource file that satisfies a predetermined condition or is authorized to be viewed via a member node.

In the solution disclosed above, preferably, the individual is capable of querying and browsing a resource file associated with a real physical resource owned by the individual via a member node.

In the solution disclosed above, preferably, the management operation on a real physical resource associated with the registered resource file comprises transferring ownership of the real physical source indicated by the resource file, and after the transfer operation is completed, a new owner of the real physical source re-registering a new resource file via a member node.

In the solution disclosed above, preferably, the management operation on a real physical resource associated with the registered resource file comprises publishing information of a real physical source associated with the registered resource file, and thereupon performing leasing and/or rental operations associated with the real physical resource.

In the solution disclosed above, preferably, the management operation on a real physical resource associated with the registered resource file comprises storage, backup, and management of an auxiliary file associated with the transfer operation, and the transfer operation is actually performed only if the auxiliary file satisfies a predetermined condition.

In the solution disclosed above, preferably, the management operation on a real physical resource associated with the registered resource file comprises an intermediary entity entrusted and selected by an individual via a member node managing a real physical source associated with the registered resource file.

The object of the present invention may also be achieved by the following technical solution:

A resource file processing method based on a blockchain structure, comprising the steps of:

(A1) a member node in a blockchain consisting of at least one supervision node and at least one member node constructs a resource file registration request according to a user instruction, and sends the resource file registration request to one of the at least one supervision node, wherein the at least one supervision node and each of the at least one member node are separate blocks that are mutually connected;

(A2) according to the resource file registration request from any member node, the at least one supervision node audits and registers a resource file indicated by the resource file registration request, and transmits the registration result back to the member node initiating the resource file registration request;

(A3) the at least one member node performs an operation on a real physical resource associated with the registered resource file by performing data communication with another member node.

In the solution disclosed above, preferably, only the supervision node can audit and register the resource file.

In the solution disclosed above, preferably, the resource file is an electronic file and is transmitted in an encrypted manner between related nodes of the blockchain.

In the solution disclosed above, preferably, each of the at least one member node can be associated with an intermediary entity and/or individual, i.e., the intermediary entity and/or individual can access the blockchain via one or more of the at least one member node.

In the solution disclosed above, preferably, after the intermediary entity accesses the blockchain via one or more of the at least one member node, the intermediary entity is capable of performing a management operation on a real physical resource associated with the registered resource file via the member node.

In the solution disclosed above, preferably, after the individual accesses the blockchain via one or more of the at least one member node, the individual is capable of performing a management operation on a real physical resource associated with the registered resource file via the member node and/or by performing data communication with a member node accessed by the intermediary entity.

In the solution disclosed above, preferably, the intermediary entity is capable of querying and browsing a resource file that satisfies a predetermined condition or is authorized to be viewed via a member node.

In the solution disclosed above, preferably, the individual is capable of querying and browsing a resource file associated with a real physical resource owned by the individual via a member node.

In the solution disclosed above, preferably, the management operation on a real physical resource associated with the registered resource file comprises transferring ownership of the real physical source indicated by the resource file, and after the transfer operation is completed, a new owner of the real physical source re-registering a new resource file via a member node.

In the solution disclosed above, preferably, the management operation on a real physical resource associated with the registered resource file comprises publishing information of a real physical source associated with the registered resource file, and thereupon performing leasing and/or rental operations associated with the real physical resource.

In the solution disclosed above, preferably, the management operation on a real physical resource associated with the registered resource file comprises storage, backup, and management of an auxiliary file associated with the transfer operation, and the transfer operation is actually performed only if the auxiliary file satisfies a predetermined condition.

In the solution disclosed above, preferably, the management operation on a real physical resource associated with the registered resource file comprises an intermediary entity entrusted and selected by an individual via a member node managing a real physical source associated with the registered resource file.

The resource file processing system and method based on a blockchain structure disclosed by the present invention have the following advantages: high data processing efficiency as the supervision node 1 is only used to audit and register resource files and other nodes in the block chain perform other processing of resource files, and high security as resource files and associated auxiliary files are managed and tracked through the blockchain.

DESCRIPTION OF THE DRAWINGS

In view of the figures, the technical features and advantages of the present invention will be better understood by those skilled in the art, wherein.

DETAILED EMBODIMENTS

Figure 1:
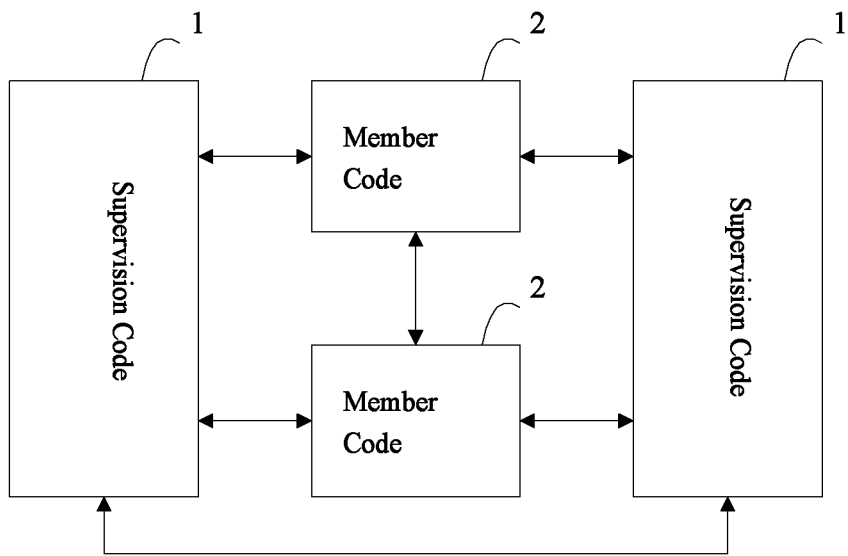
FIG. 1 is a schematic structural diagram of a resource file processing system based on a blockchain structure, in accordance with an embodiment of the present invention.

FIG. 1 is a schematic structural diagram of a resource file processing system based on a blockchain structure, in accordance with an embodiment of the present invention. As illustrated in FIG. 1, the resource file processing system based on a blockchain structure as disclosed in the present invention comprises at least one supervision node 1 and at least one member node 2, and the at least one supervision node 1 and each of the at least one member node 2 are separate blocks that are mutually connected to form a blockchain. The at least one supervision node 1 (e.g., a real estate supervision and auditing agency node), according to a resource file registration request from any member node 2, audits and registers a resource file (e.g., a real estate ownership file) indicated by the resource file registration request, and transmits the registration result back to the member node 2 initiating the resource file registration request. Each of the at least one member node 2 can construct the resource file registration request according to a user instruction, and sends the resource file registration request to one of the at least one supervision node 1. The at least one member node 2 can further perform an operation (e.g., transfer of ownership of a house or housing lease) on a real physical resource (e.g., a house) associated with the registered resource file by performing data communication with another member node 2.

Preferably, in the resource file processing system based on a blockchain structure as disclosed in the present invention, only the supervision node 1 can audit and register the resource file.

Preferably, in the resource file processing system based on a blockchain structure as disclosed in the present invention, the resource file is an electronic file and is transmitted in an encrypted manner between related nodes of the blockchain.

Preferably, in the resource file processing system based on a blockchain structure as disclosed in the present invention, each of the at least one member node 2 can be associated with an intermediary entity (e.g., a housing agency) and/or individual, i.e., the intermediary entity (e.g., the housing agency) and/or individual can access the blockchain via one or more of the at least one member node 2.

Preferably, in the resource file processing system based on a blockchain structure as disclosed in the present invention, after the intermediary entity (e.g., the housing agency) accesses the blockchain via one or more of the at least one member node 2, the intermediary entity is capable of performing a management operation (e.g., housing sale or lease) on a real physical resource (e.g., a house) associated with the registered resource file via the member node 2.

Preferably, in the resource file processing system based on a blockchain structure as disclosed in the present invention, after the individual accesses the blockchain via one or more of the at least one member node 2, the individual is capable of performing a management operation (e.g., housing sale or lease) on a real physical resource (e.g., a house) associated with the registered resource file via the member node 2 and/or by performing data communication with a member node 2 accessed by the intermediary entity.

Preferably, in the resource file processing system based on a blockchain structure as disclosed in the present invention, the intermediary entity is capable of querying and browsing a resource file that satisfies a predetermined condition or is authorized to be viewed via a member node 2.

Preferably, in the resource file processing system based on a blockchain structure as disclosed in the present invention, the individual is capable of querying and browsing a resource file associated with a real physical resource owned by the individual via a member node 2.

Preferably, in the resource file processing system based on a blockchain structure as disclosed in the present invention, the management operation on a real physical resource associated with the registered resource file comprises transferring ownership of the real physical source indicated by the resource file, and after the transfer operation is completed, a new owner of the real physical source re-registering a new resource file via a member node 2.

Preferably, in the resource file processing system based on a blockchain structure as disclosed in the present invention, the management operation on a real physical resource associated with the registered resource file comprises publishing information of a real physical source associated with the registered resource file, and thereupon performing leasing and/or rental operations associated with the real physical resource.

Preferably, in the resource file processing system based on a blockchain structure as disclosed in the present invention, the management operation on a real physical resource associated with the registered resource file comprises storage, backup, and management of an auxiliary file (e.g., a real estate sales contract) associated with the transfer operation, and the transfer operation is actually performed only if the auxiliary file satisfies a predetermined condition.

Preferably, in the resource file processing system based on a blockchain structure as disclosed in the present invention, the management operation on a real physical resource associated with the registered resource file comprises an intermediary entity entrusted and selected by an individual via a member node 2 managing a real physical source associated with the registered resource file (e.g., entrusting a housing agency to sell or lease a house).

It can be seen from the above that the resource file processing system based on a blockchain structure as disclosed in the present invention has the following advantages: high data processing efficiency as the supervision node 1 is only used to audit and register resource files and other nodes in the block chain perform other processing of resource files, and high security as resource files and associated auxiliary files are managed and tracked through the blockchain.

Figure 2:
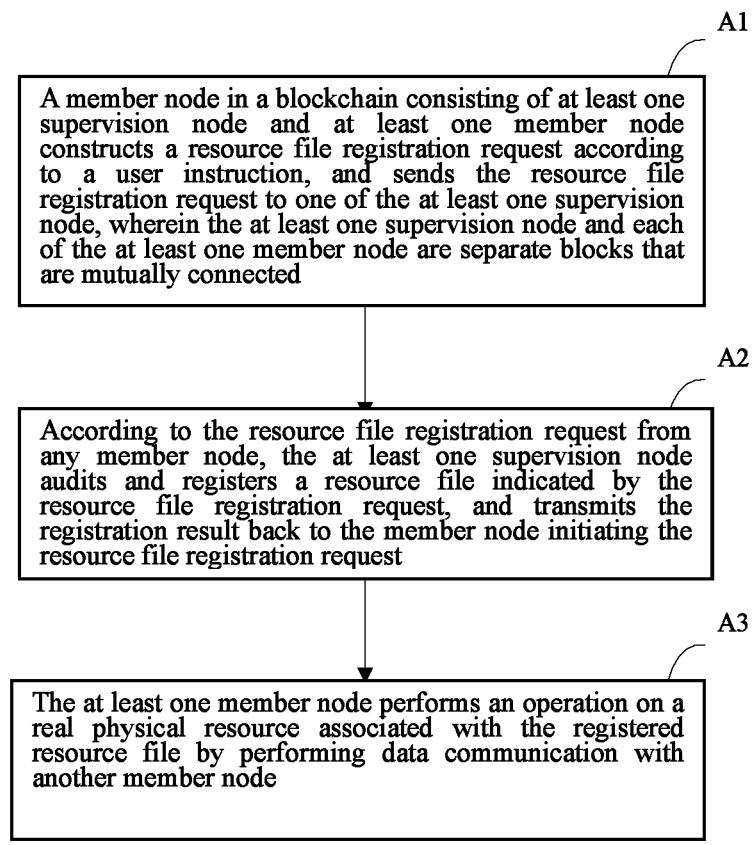
FIG. 2 is a flow chart of a resource file processing method based on a blockchain structure, in accordance with an embodiment of the present invention.

FIG. 2 is a flow chart of a resource file processing method based on a blockchain structure, in accordance with an embodiment of the present invention. As illustrated in FIG. 2, the resource file processing method based on a blockchain structure as disclosed in the present invention comprises the steps of: (A1) a member node in a blockchain consisting of at least one supervision node and at least one member node constructs a resource file registration request according to a user instruction, and sends the resource file registration request to one of the at least one supervision node, wherein the at least one supervision node and each of the at least one member node are separate blocks that are mutually connected; (A2) according to the resource file registration request from any member node, the at least one supervision node audits and registers a resource file (e.g., a real estate ownership file) indicated by the resource file registration request, and transmits the registration result back to the member node initiating the resource file registration request; (A3) the at least one member node performs an operation (e.g., transfer of ownership of a house or housing lease) on a real physical resource (e.g., a house) associated with the registered resource file by performing data communication with another member node.

Preferably, in the resource file processing method based on a blockchain structure as disclosed in the present invention, only the supervision node can audit and register the resource file.

Preferably, in the resource file processing method based on a blockchain structure as disclosed in the present invention, the resource file is an electronic file and is transmitted in an encrypted manner between related nodes of the blockchain.

Preferably, in the resource file processing method based on a blockchain structure as disclosed in the present invention, each of the at least one member node can be associated with an intermediary entity (e.g. a housing agency) and/or individual, i.e., the intermediary entity (e.g., the housing agency) and/or individual can access the blockchain via one or more of the at least one member node.

Preferably, in the resource file processing method based on a blockchain structure as disclosed in the present invention, after the intermediary entity (e.g., the housing agency) accesses the blockchain via one or more of the at least one member node, the intermediary entity is capable of performing a management operation (e.g., housing sale or lease) on a real physical resource (e.g., a house) associated with the registered resource file via the member node.

Preferably, in the resource file processing method based on a blockchain structure as disclosed in the present invention, after the individual accesses the blockchain via one or more of the at least one member node, the individual is capable of performing a management operation (e.g., housing sale or lease) on a real physical resource (e.g., a house) associated with the registered resource file via the member node and/or by performing data communication with a member node accessed by the intermediary entity.

Preferably, in the resource file processing method based on a blockchain structure as disclosed in the present invention, the intermediary entity is capable of querying and browsing a resource file that satisfies a predetermined condition or is authorized to be viewed via a member node.

Preferably, in the resource file processing method based on a blockchain structure as disclosed in the present invention, the individual is capable of querying and browsing a resource file associated with a real physical resource owned by the individual via a member node.

Preferably, in the resource file processing method based on a blockchain structure as disclosed in the present invention, the management operation on a real physical resource associated with the registered resource file comprises transferring ownership of the real physical source indicated by the resource file, and after the transfer operation is completed, a new owner of the real physical source re-registering a new resource file via a member node.

Preferably, in the resource file processing method based on a blockchain structure as disclosed in the present invention, the management operation on a real physical resource associated with the registered resource file comprises publishing information of a real physical source associated with the registered resource file, and thereupon performing leasing and/or rental operations associated with the real physical resource.

Preferably, in the resource file processing method based on a blockchain structure as disclosed in the present invention, the management operation on a real physical resource associated with the registered resource file comprises storage, backup, and management of an auxiliary file (e.g., a real estate sales contract) associated with the transfer operation, and the transfer operation is actually performed only if the auxiliary file satisfies a predetermined condition.

Preferably, in the resource file processing method based on a blockchain structure as disclosed in the present invention, the management operation on a real physical resource associated with the registered resource file comprises an intermediary entity entrusted and selected by an individual via a member node managing a real physical source associated with the registered resource file (e.g., entrusting a housing agency to sell or lease a house).

It can be seen from the above that the resource file processing method based on a blockchain structure as disclosed in the present invention has the following advantages: high data processing efficiency as the supervision node 1 is only used to audit and register resource files and other nodes in the block chain perform other processing of resource files, and high security as resource files and associated auxiliary files are managed and tracked through the blockchain.

The present invention has been described in terms of the aforesaid preferred embodiments, however, the implementations thereof are not limited to the embodiments described above. It will be appreciated that various changes and modifications can be made by those skilled in the art without departing from the spirit and scope of the invention.

The invention claimed is:

1. A resource file processing system based on a blockchain structure, comprising:
at least one supervision node; and
at least one member node,
wherein the at least one supervision node and each of the at least one member node are separate blocks that are mutually connected to form a blockchain,
wherein the at least one supervision node, according to a resource file registration request from the at least one member node, is configured to audit and register a resource file indicated by the resource file registration request, and transmit a registration result back to the member node initiating the resource file registration request,
wherein each of the at least one member node is configured to construct the resource file registration request according to a user instruction, and is configured to send the resource file registration request to one of the at least one supervision node, and
wherein the at least one member node is further configured to perform an operation on a real physical resource associated with the registered resource file by performing data communication with another one of the at least one member node,
wherein the resource file comprises an electronic file and is transmitted in an encrypted manner between related nodes of the blockchain,
wherein each of the at least one member node is configured to be associated with an intermediary entity and/or individual,
wherein the intermediary entity and/or individual is configured to access the blockchain via one or more of the at least one member node,
wherein a management operation on a real physical resource associated with the registered resource file comprises transferring ownership of the real physical source indicated by the resource file,
wherein after the transfer operation is completed, a new owner of the real physical source re-registers a new resource file via the one or more of the at least one member node,
wherein the management operation on a real physical resource associated with the registered resource file comprises publishing information of a real physical source associated with the registered resource file, and thereupon performing leasing and/or rental operations associated with the real physical resource, and
wherein the management operation on a real physical resource associated with the registered resource file comprises storage, backup, and management of an auxiliary file associated with the transfer operation, and the transfer operation is actually performed when the auxiliary file satisfies a predetermined condition.

2. The resource file processing system based on the blockchain structure of claim 1,
wherein the supervision node is configured to audit and register the resource file.

3. The resource file processing system based on the blockchain structure of claim 1,
wherein after the intermediary entity accesses the blockchain via one or more of the at least one member node, the intermediary entity is performs a management operation on a real physical resource associated with the registered resource file via one or more of the at least one member node.

4. The resource file processing system based on the blockchain structure of claim 3,
wherein after the individual accesses the blockchain via one or more of the at least one member node, the individual is performs a management operation on a real physical resource associated with the registered resource file via one or more of the at least one member node and/or by performing data communication with a member node accessed by the intermediary entity.

5. The resource file processing system based on the blockchain structure of claim 4,
wherein the intermediary entity is configured to perform operations comprising querying and browsing a resource file that satisfies a predetermined condition or is authorized to be viewed via the one or more of the at least one member node.

6. The resource file processing system based on the blockchain structure of claim 5,
wherein the individual is configured to perform operations comprising querying and browsing a resource file associated with a real physical resource owned by the individual via the one or more of the at least one member node.

7. The resource file processing system based on the blockchain structure of claim 1,
wherein the management operation on a real physical resource associated with the registered resource file comprises an intermediary entity entrusted and selected by an individual via one of the at least one member node that is managing a real physical source associated with the registered resource file.

8. A resource file processing method based on a blockchain structure, comprising:
a node in a blockchain comprising at least one supervision node and at least one member node constructing a resource file registration request according to a user instruction, and sends the resource file registration request to one of the at least one supervision node, wherein the at least one supervision node and each of the at least one member node are separate blocks that are mutually connected;
according to the resource file registration request from one of the at least one member node, the at least one supervision node auditing and registering a resource file indicated by the resource file registration request, and transmitting the registration result back to the one of the at least one member node initiating the resource file registration request; and
the at least one member node performs an operation on a real physical resource associated with the registered resource file by performing data communication with another one of the at least one member node,
wherein the resource file comprises an electronic file and is transmitted in an encrypted manner between related nodes of the blockchain,
wherein each of the at least one member node is configured to be associated with an intermediary entity and/or individual,
wherein the intermediary entity and/or individual is configured to access the blockchain via one or more of the at least one member node,
wherein a management operation on a real physical resource associated with the registered resource file comprises transferring ownership of the real physical source indicated by the resource file,
wherein after the transfer operation is completed, a new owner of the real physical source re-registers a new resource file via the one or more of the at least one member node, wherein the management operation on a real physical resource associated with the registered resource file comprises publishing information of a real physical source associated with the registered resource file, and thereupon performing leasing and/or rental operations associated with the real physical resource, and
wherein the management operation on a real physical resource associated with the registered resource file comprises storage, backup, and management of an auxiliary file associated with the transfer operation, and the transfer operation is actually performed when the auxiliary file satisfies a predetermined condition.

9. The resource file processing method based on the blockchain structure of claim 8,
wherein the supervision node is configured to audit and register the resource file.

10. The resource file processing method based on the blockchain structure of claim 8,
wherein after the intermediary entity accesses the blockchain via one or more of the at least one member node, the intermediary entity is configured to perform a management operation on a real physical resource associated with the registered resource file via the one or more of the at least one member node.

11. The resource file processing method based on the blockchain structure of claim 10,
wherein after the individual accesses the blockchain via one or more of the at least one member node, the individual is configured to perform a management operation on a real physical resource associated with the registered resource file via the at least one member node and/or by performing data communication with one of the at least one member node accessed by the intermediary entity.

12. The resource file processing method based on the blockchain structure of claim 11,
wherein the intermediary entity is configured to perform operations comprising querying and browsing a resource file that satisfies a predetermined condition or is authorized to be viewed via one of the at least one member node.

13. The resource file processing method based on the blockchain structure of claim 12,
wherein the individual is configured to perform operations comprising querying and browsing a resource file associated with a real physical resource owned by the individual via one of the at least one member node.

14. The resource file processing method based on the blockchain structure of claim 8,
wherein the management operation on a real physical resource associated with the registered resource file comprises an intermediary entity entrusted and selected by an individual via one of the at least one member node managing a real physical source associated with the registered resource file.

* * * * *